US006668427B2

(12) United States Patent
Bulanda et al.

(10) Patent No.: US 6,668,427 B2
(45) Date of Patent: Dec. 30, 2003

(54) BALL LOCK CABLE TIE HAVING AN AGGRESSIVE RAMP

(75) Inventors: John J. Bulanda, New Lenox, IL (US); Joseph A. Chopp, Jr., New Lenox, IL (US); Bernard J. O'Grady, Crestwood, IL (US); David P. Newman, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/201,751

(22) Filed: Jul. 23, 2002

(65) Prior Publication Data

US 2003/0204937 A1 Nov. 6, 2003

Related U.S. Application Data

(60) Provisional application No. 60/377,448, filed on May 2, 2002.

(51) Int. Cl.⁷ .................... B65D 63/02; F16L 33/00
(52) U.S. Cl. .................... 24/25; 24/21; 24/22; 24/23 R; 24/136 A; 24/115 L
(58) Field of Search .................... 24/21, 22, 23, 24/25, 115 L, 136 A, 268

(56) References Cited

U.S. PATENT DOCUMENTS

| ,025,125 A | * | 8/1859 | Knowles .................... 24/25 |
| ,205,720 A | * | 7/1878 | Blossom .................... 24/25 |
| ,225,517 A | * | 3/1880 | Gilman .................... 24/25 |
| ,296,686 A | * | 4/1884 | Gresham .................... 24/25 |
| 3,015,865 A | | 1/1962 | Rapuzzi |
| 4,128,919 A | | 12/1978 | Bulanda et al. |
| 4,366,602 A | | 1/1983 | Conlon et al. |
| 4,399,592 A | | 8/1983 | Chopp, Jr. et al. |
| 4,473,925 A | | 10/1984 | Jansen |
| 4,935,993 A | * | 6/1990 | Bree .................... 24/136 A |
| 5,103,534 A | | 4/1992 | Caveney |
| 5,291,637 A | | 3/1994 | Meyers |
| 5,697,736 A | * | 12/1997 | Veazey et al. .................... 405/284 |
| 5,732,446 A | | 3/1998 | Blanks |
| 5,759,004 A | | 6/1998 | Kuffel |
| 5,850,674 A | | 12/1998 | Jansen |
| 6,014,792 A | | 1/2000 | Marelin et al. |
| 6,076,235 A | | 6/2000 | Khokhar |
| 6,122,804 A | * | 9/2000 | Gamaggio-Schafer .................... 24/25 |
| 6,477,746 B1 | * | 11/2002 | Axelsson .................... 24/25 |

* cited by examiner

*Primary Examiner*—Victor Sakran
(74) *Attorney, Agent, or Firm*—Robert A. McCann; Jay A. Saltzman; Christopher S. Clancy

(57) ABSTRACT

A metal cable tie is disclosed. The cable tie includes an elongate metallic strap, a metallic locking head, and metallic roller means. The strap has a first end and a second end opposite the first end. The head is secured to the first end of the strap for receiving the second end of the strap. The head comprises a strap entry face, a strap exit face, and a strap-receiving aperture extending therebetween. The head further comprises a floor and a roof which diverge in the direction of the exit face. The metallic roller means lockingly engages the strap, and the head comprises retention means disposed adjacent the exit face for captively holding the roller means within the head. The roller means is movable between a threading position wherein the roller means is disposed adjacent the exit face and the retention means, and a locking position wherein the roller means is closer the entry face. The ratio of the distance from a point along a ceiling to the center of the roller means in the threading position to the diameter of the roller means is less than 1.7.

6 Claims, 8 Drawing Sheets

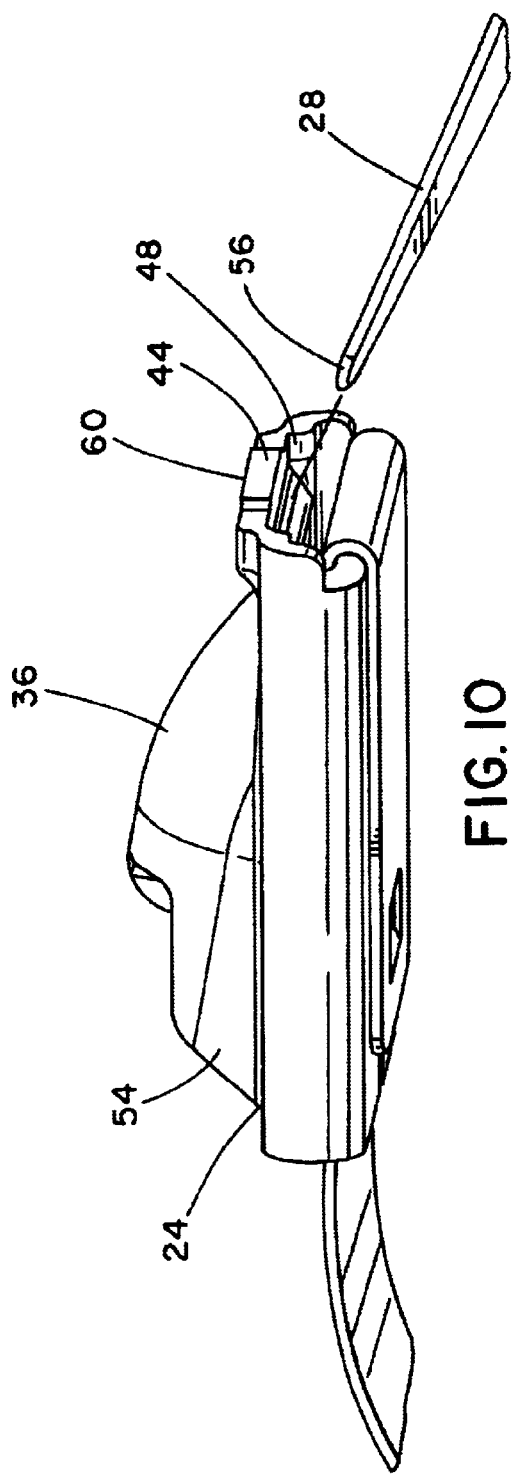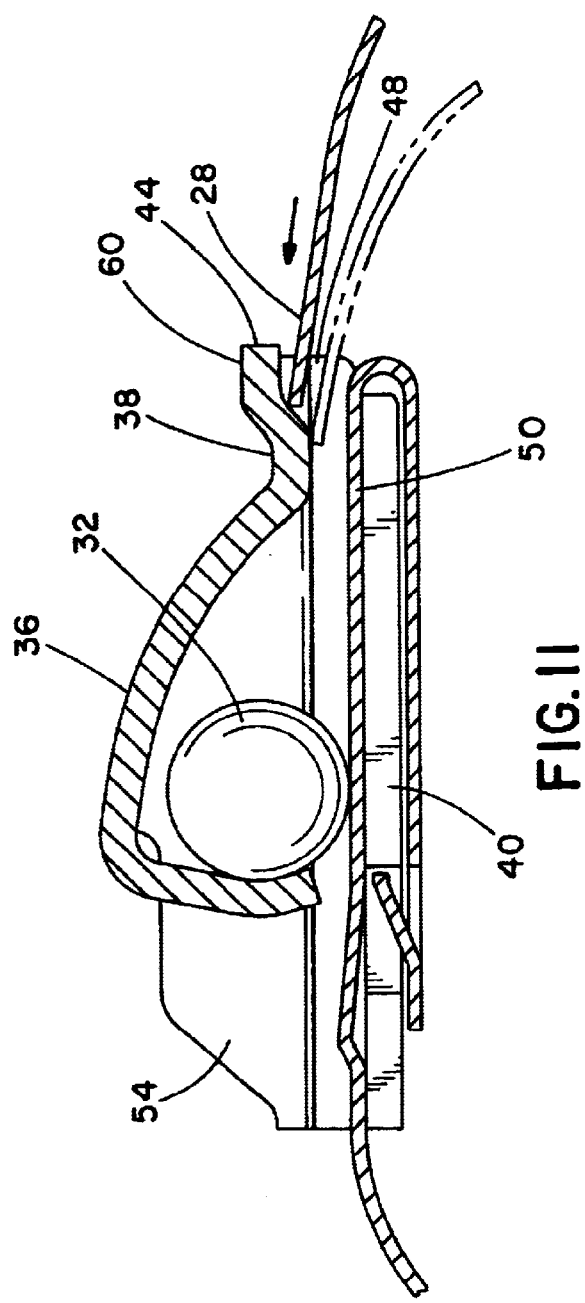

BALL LOCK CABLE TIE HAVING AN AGGRESSIVE RAMP

CROSS-REFERENCE TO RELATED APPLICATIONS

This application claims priority to U.S. Provisional Application Serial No. 60/377,448, filed on May 2, 2002.

BACKGROUND OF THE INVENTION

The present invention is directed to a cable tie, and more particularly, to a three-piece metal cable tie that utilizes a roller means as the locking mechanism.

Metallic bundling devices incorporating locking balls and roller pins have been used for bundling bales of cotton or the like since the Nineteenth Century. None of the prior devices were positive locking, i.e. depending on the orientation of the locking head, gravity could hold the ball out of locking engagement with the strap resulting in release. U.S. Pat. No. 4,399,592 addressed this problem by teaching the addition of a raised portion or protuberance for deflecting the threaded strap away from the floor as the threaded strap exits the locking head. This deflection ensures that the locking ball is in continuous engagement with the threaded strap regardless of the position of the ball or the orientation of the locking head.

It would be desirable to provide a cable tie having improved tensile strength.

It would also be desirable to provide a cable tie having a steeper ramp on the inside of the locking head, resulting in quicker lockup and a tighter bundle.

SUMMARY OF THE INVENTION

A metal cable tie is disclosed. The cable tie includes an elongate metallic strap, a metallic locking head, and metallic roller means. The strap has a first end and a second end opposite the first end. The head is secured to the first end of the strap for receiving the second end of the strap. The head comprises a strap entry face, a strap exit face, and a strap-receiving aperture extending therebetween. The head further comprises a floor and a roof which diverge in the direction of the exit face. The metallic roller means lockingly engages the strap, and the head comprises retention means disposed adjacent the exit face for captively holding the roller means within the head. The roller means is movable between a threading position wherein the roller means is disposed adjacent the exit face and the retention means, and a locking position wherein the roller means is closer to the entry face. The ratio of the distance from a point along the ceiling to the center of the roller means in the threading position to the diameter of the roller means is less than 1.7.

Preferably, the strap is coated.

Preferably, the cable tie is made of stainless steel.

Preferably, the locking head has a lead-in portion at the entry face.

Preferably, the retention means is a finger extending from the roof adjacent the exit face.

Preferably, the roller means is a ball.

BRIEF DESCRIPTION OF FIGURES

FIG. 10 is a side perspective view of the strap being threaded into a lead-in portion of the locking head; and FIG. 11 is a sectional view of the strap being threaded into the lead-in portion of the locking head.

DETAILED DESCRIPTION OF THE PREFERRED EMBODIMENTS

The illustrated embodiments of the invention are directed to a three-piece cable tie that utilizes a roller means as the locking mechanism.

Figure 1:
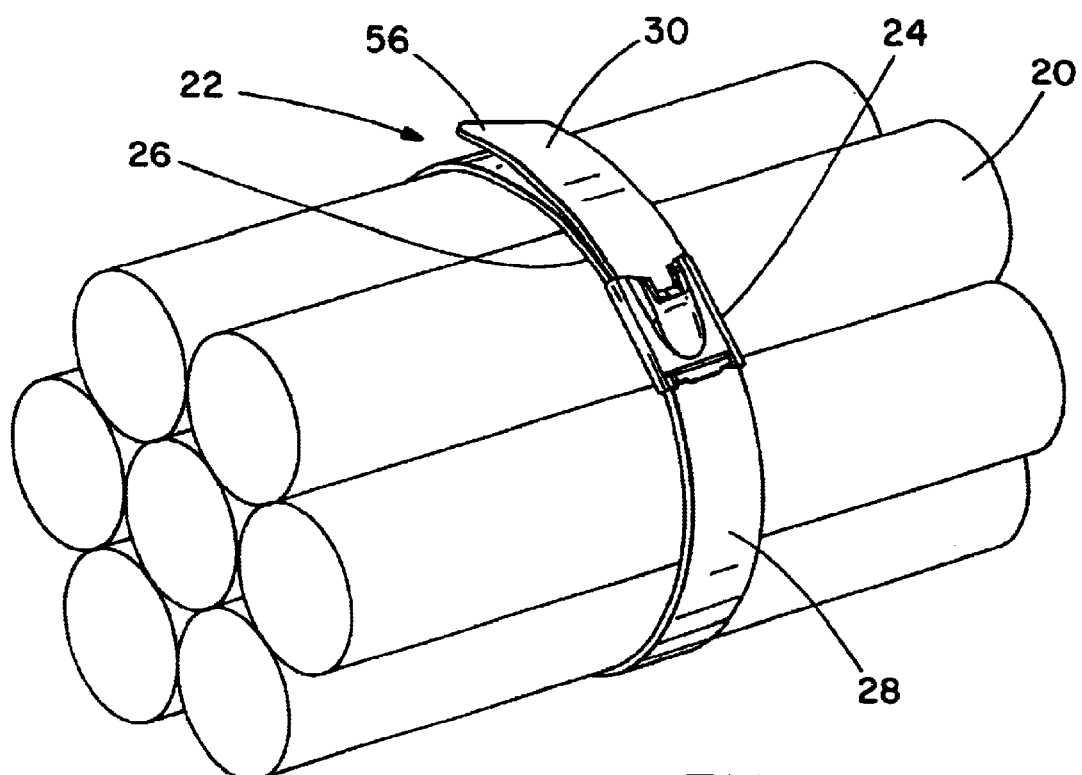
FIG. 1 is a perspective view of the metal tie of the present invention shown secured around a bundle of wires.

Referring now to the drawings, a cable tie for bundling a plurality of elongate objects, such as wires 20, and for holding objects together is generally indicated in FIG. 1 by reference numeral 22. Cable tie 22 includes a locking head 24 secured to a first end 26 of an elongate strap 28 for receiving a second end 30 of the strap 28, and roller means in the form of a ball or sphere 32, best shown in FIGS. 5–9, for retaining the strap 28 within the locking head 24. Preferably, the ball, head and strap are formed of stainless steel to allow the strap to be used over a wide temperature range and to give the cable tie high strength and excellent resistance to corrosion. Additionally, as known in the art, the strap 28 may be coated.

Figure 2:
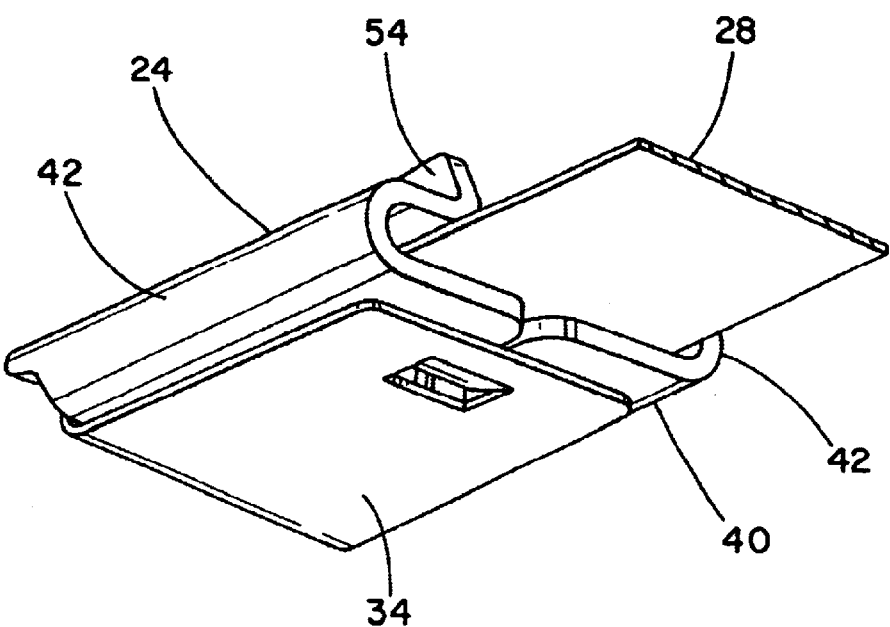
FIG. 2 is a partial perspective view of the underside of the locking head of the cable tie of FIG. 1.
Figure 3:
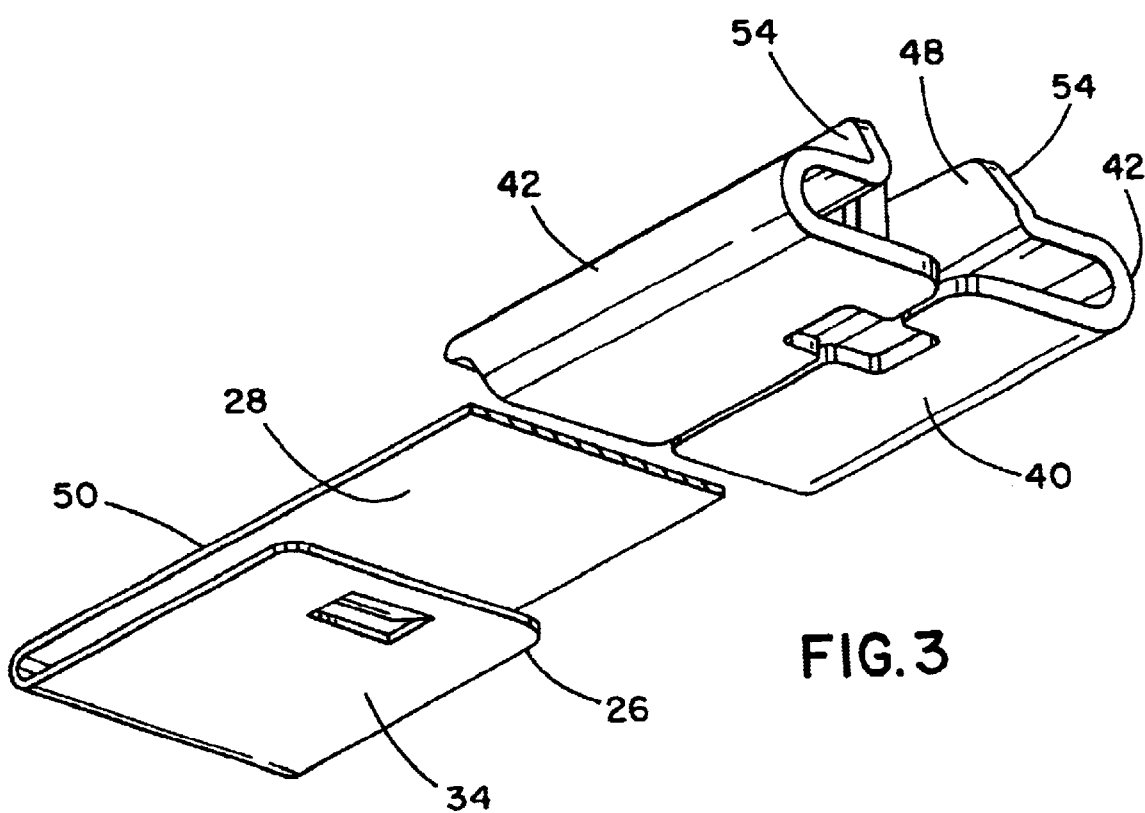
FIG. 3 is an exploded view of FIG. 2 with a strap portion separate from the locking head.
Figure 5:
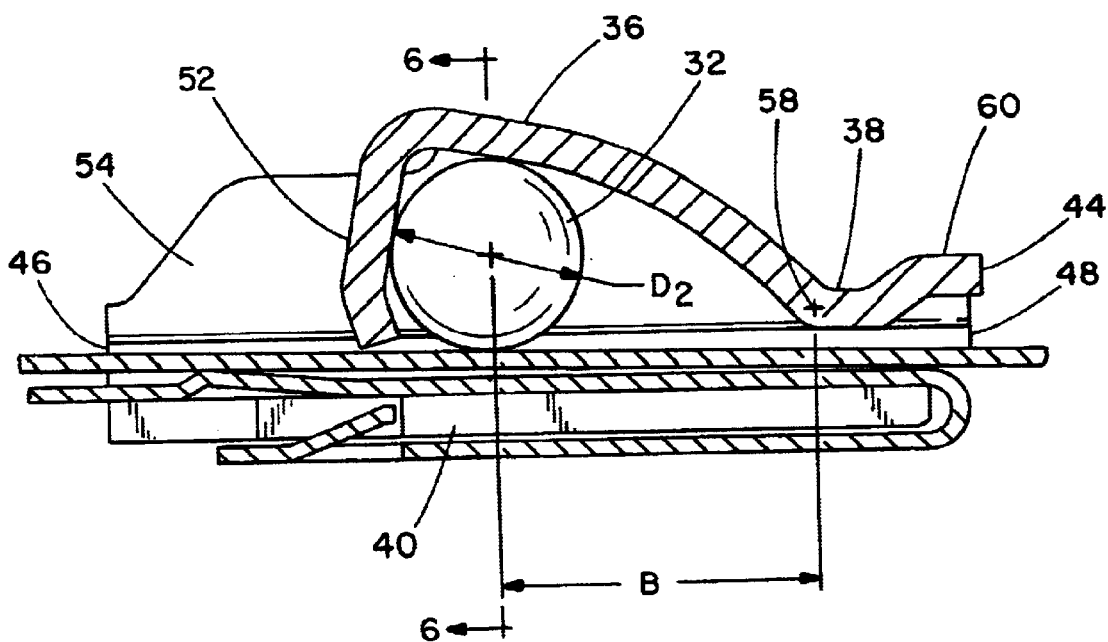
FIG. 5 is a sectional view of the strap and the locking head which depicts the locking ball in its threading position.
Figure 6:
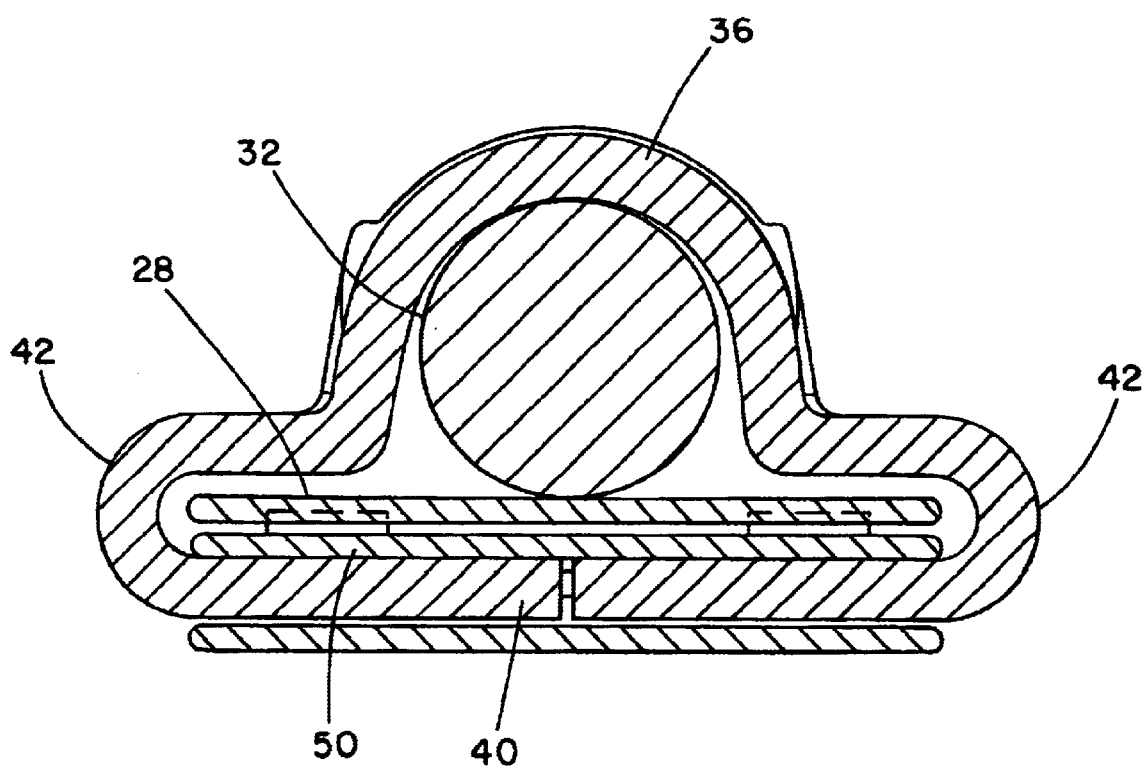
FIG. 6 is a sectional view taken along lines 6—6 of FIG. 5.

The cable tie of the present invention is formed by assembling a locking head 24, a strap 28 and a hooked portion 34 formed integral with the strap 28 as shown in FIG. 3. Referring to FIGS. 2, 3 and 5, locking head 24 comprises a roof 36, a ceiling 38, and a bottom wall 40 with the ceiling 38 and bottom wall 40 joined by a pair of sidewalls 42.

Figure 7:
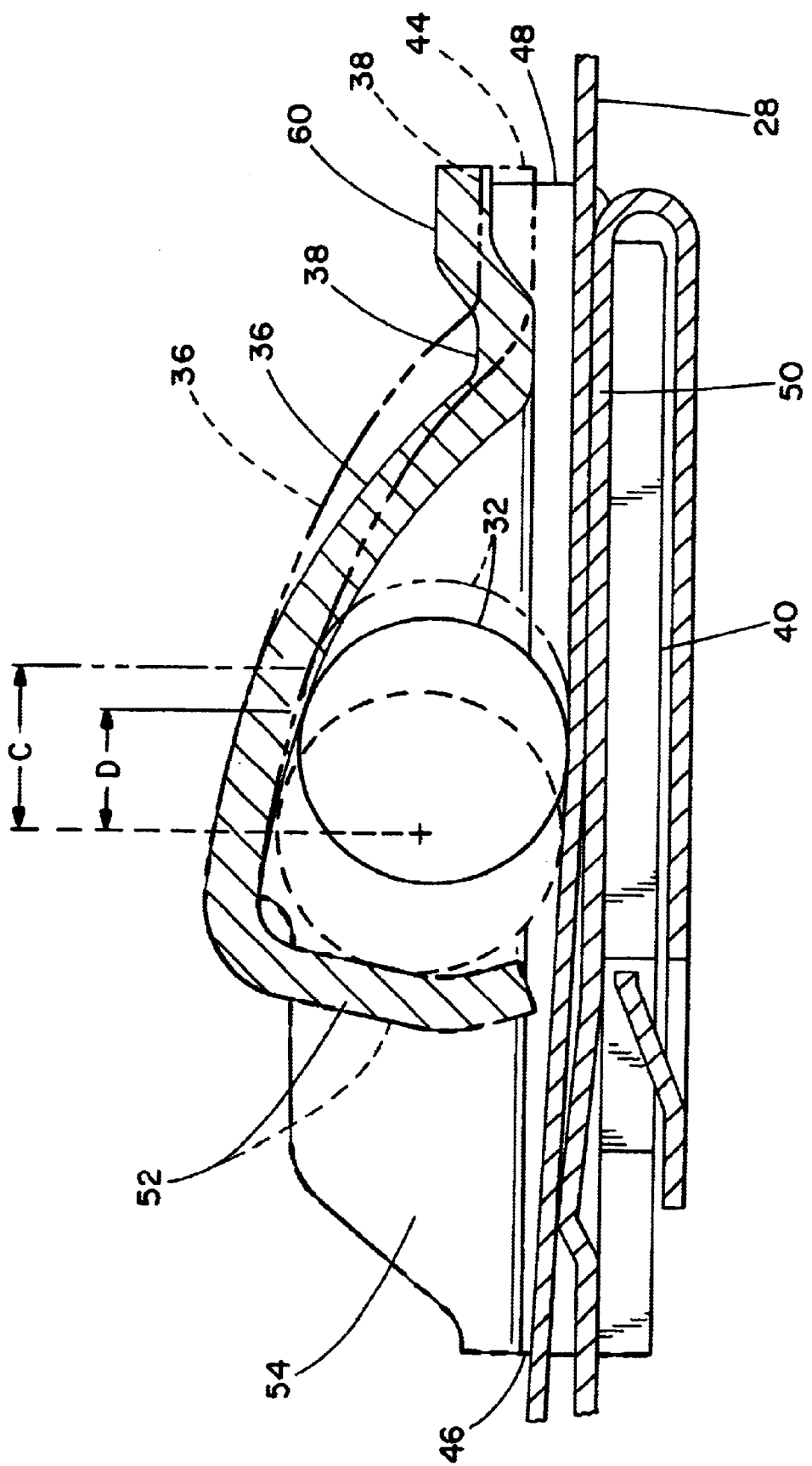
FIG. 7 is a sectional view of the strap and the locking head, comparing movement of the locking ball from its threading positions to its locking positions.
Figure 8:
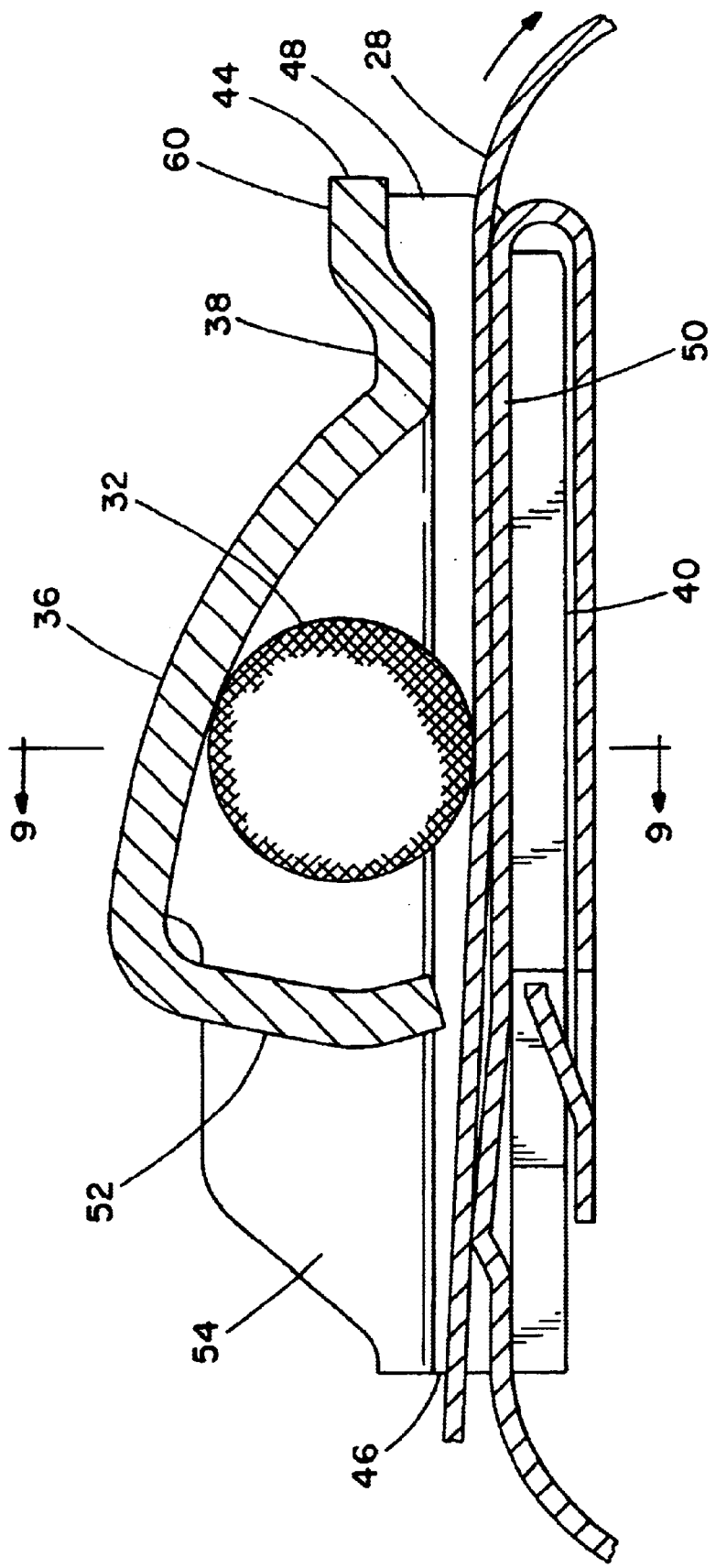
FIG. 8 is a sectional view of the strap and the locking head which depicts the locking ball moving toward its locking position.

As shown in FIGS. 5, 7 and 8, the locking head 24 includes a strap entry face 44, a strap exit face 46, and a strap-receiving aperture 48 extending therebetween. The roof 36 and floor 50 diverge in the direction of the exit face 46. The ball 32 has a textured or roughened surface to increase its coefficient of friction with the strap 28 and roof 36. The ball 32 is captively held between the roof 36 and floor 50 by retention means comprising a finger 52 extending from the roof 36 towards the floor 50 adjacent the exit face 46. One end of the roof 36 joins the ceiling 38 adjacent the entry face 44 with spaced side wings 54 joining other parts of the roof 36 and ceiling 38.

The locking ball 32 is movable between a threading position, shown in FIG. 5, wherein the ball 32 is disposed engaging finger 52 adjacent exit face 46 and a locking position, shown in FIG. 7, wherein the ball 32 is closer to entry face 44 and securely engages the threaded strap 28. In its threading position, the ball 32 concurrently engages the finger 52 and roof 36.

In operation, after the strap 28 is wrapped around the objects to be held, tip 56 is inserted into the locking head 24, as shown in FIG. 10. Continued threading of the strap 28 results in positive engagement of the strap 28 and ball 32 at any angle the head 24 is held. After the strap 28 has been tightened and released, locking ball 32 moves to its locking position, shown in FIG. 7, where the strap 28 is compressively held between the ball 32 and the floor 50.

Figure 4:
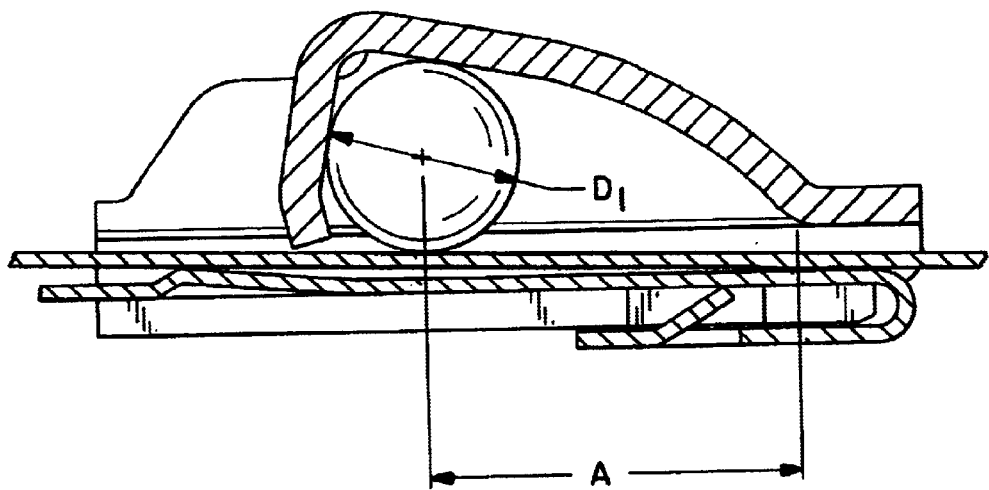
FIG. 4 is a sectional view of a metal tie according to the prior art.

As shown in FIG. 5, locking head 24 has a continuous angled ramp extending from the ceiling 38 at a point 58 along the roof 36. Increasing the steepness of the ramp on the inside of the head 24 reduces the amount of movement of strap 28 and, thus, provides quicker lockup for ball 32. As a result, the ball lockup position is closer to the center of the locking head 24, which increases the strength of head 24, The steepness of the ramp is measured by the ratio of the distance (B) from the ceiling 38 at point 58 to the center of the locking ball 32 in the threading position to the diameter (D2) of the locking ball 32. As shown in FIG. 4, in prior art cable ties, the distance (A) from the ceiling to the center of the locking ball in the threading position is 0.22 inches and the diameter (D1) of the locking ball is 0.125 inches. Thus, the ratio of A to D1 is 1.76. Conversely, in FIG. 5, the distance (B) from the ceiling 38 at point 58 to the center of the locking ball 32 in the threading position is 0.195 inches and the diameter (D2) of the locking ball 32 is 0.125 inches. Thus, the ratio of B to D2 is 1.56.

Figure 9:
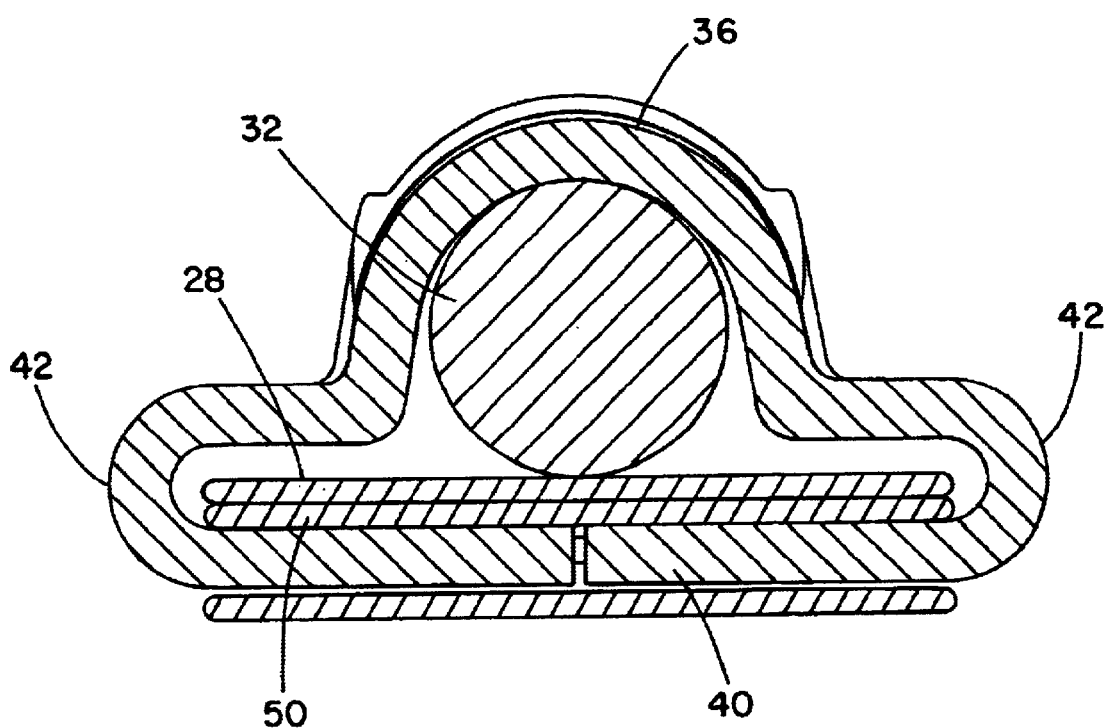
FIG. 9 is a sectional view taken along lines 9—9 of FIG. 8.

FIG. 7 shows (in phantom) the movement of the ball 32 from its threading position to its locking position, according to the prior art. The prior art locking head shown in FIG. 4 is superimposed (in phantom) over the locking head 24 of FIG. 5. In the prior art embodiment, the ball moves a distance C during lockup. However, as shown in FIG. 7, the locking ball 32 of the present invention moves a shorter distance D during lockup. Typically, the strap 28 moves approximately twice the distance of the locking ball 32 when the locking ball 32 moves from its threading position to its locking position. Thus, decreasing the distance the ball 32 moves during lockup greatly decreases the amount of movement of strap 28, and increases the performance of the metal tie. FIG. 8 shows the locking ball 32 of FIG. 5 moving toward its locking position, and FIG. 9 shows a cross-sectional view of the locking ball of FIG. 8.

As shown in FIGS. 10 and 11, locking head 24 includes a lead-in portion 60 at the strap entry face 44. The lead-in portion 60 facilitates the initial insertion of tip 56 into the locking head 24 and reduces installation time for threading the cable tie 22. Moreover, the lead-in portion 60 strengthens the top of the locking head 24. As best seen in FIG. 11, the strap 28 engages the lead-in portion 60 and the strap 28 is biased toward floor 50.

The disclosed invention provides a cable tie that utilizes a roller means as the locking mechanism. It should be noted that the above-described and illustrated embodiments and preferred embodiments of the invention are not an exhaustive listing of the forms such a cable tie in accordance with the invention might take; rather, they serve as exemplary and illustrative of embodiments of the invention as presently understood. Many other forms of the invention are believed to exist.

What is claimed is:

1. A cable tie, comprising:
   an elongate metallic strap having a first end and a second end opposite the first end;
   a metallic locking head secured to the first end of the strap for receiving the second end of the strap, the head comprising a strap entry face a strap exit face, and a strap-receiving aperture extending therebetween, the head further comprising a floor and a roof which diverge in the direction of the exit face; and
   metallic roller means for lockingly engaging the strap, the roller means having a center and a diameter, the head comprising retention means disposed adjacent the exit face for captively holding the roller means within the head;
   the roller means being movable from a threading position wherein the roller means is disposed adjacent the exit face and the retention means, and a locking position wherein the roller means is closer to the entry face;
   wherein the ratio of the distance from a point along a ceiling to the center of the roller means in the threading position to the diameter of the roller means is less than 1.7
   wherein the roof is provided with a steepness such that movement of the strap is minimized from the threading position to the locking position.

2. The cable tie of claim 1 wherein the strap is coated.

3. The cable tie of claim 1 wherein the strap and the head are made of stainless steel.

4. The cable tie of claim 1 wherein the head further comprises a lead-in portion at the entry face.

5. The cable tie of claim 1 wherein the retention means comprises a finger extending from the roof adjacent the exit face.

6. The cable tie of claim 1 wherein the roller means is a ball.

* * * * *